(12) United States Patent
Shively et al.

(10) Patent No.: US 6,831,609 B2
(45) Date of Patent: Dec. 14, 2004

(54) AUXILIARY ANTENNA FOR WIRELESS HANDSET

(75) Inventors: David Shively, Smyrna, GA (US); Mel Frerking, Norcross, GA (US)

(73) Assignee: Cingular Wireless, LLC, Atlanta, GA (US)

( * ) Notice: Subject to any disclaimer, the term of this patent is extended or adjusted under 35 U.S.C. 154(b) by 0 days.

(21) Appl. No.: 10/328,388

(22) Filed: Dec. 23, 2002

(65) Prior Publication Data

US 2004/0119650 A1 Jun. 24, 2004

(51) Int. Cl.[7] .................................................. H01Q 1/24
(52) U.S. Cl. ...................... 343/702; 343/906; 381/315
(58) Field of Search ................................ 343/702, 906; 381/315, 316, 321, 322; H01Q 1/24

(56) References Cited

U.S. PATENT DOCUMENTS

| 5,357,262 | A | * | 10/1994 | Blaese ........................ 343/906 |
| 5,557,287 | A | * | 9/1996 | Pottala et al. ............... 343/702 |
| 5,668,561 | A | * | 9/1997 | Perrotta et al. ............. 343/702 |
| 5,739,790 | A | * | 4/1998 | Green, Jr. .................. 343/702 |
| 5,835,064 | A | * | 11/1998 | Gomez et al. ............. 343/702 |
| 6,118,408 | A | * | 9/2000 | Yang et al. ................ 343/702 |

* cited by examiner

*Primary Examiner*—Hoanganh Le
(74) *Attorney, Agent, or Firm*—Coulter C. Henry, Jr.

(57) ABSTRACT

An auxiliary antenna for adapting a wireless handset for use with a hearing aid is provided. The auxiliary antenna is placed in a location that is away from the hearing aid such that signals transmitted from the antenna do not interfere with the transmissions of the hearing aid. The systems and methods presented provide a solution for a fixed antenna configuration and an internal antenna configuration.

7 Claims, 5 Drawing Sheets

Front

Back

AUXILIARY ANTENNA FOR WIRELESS HANDSET

BACKGROUND OF THE INVENTION

1. Field of Invention

This invention relates to remotely transmitting signals from an antenna. More specifically, this invention provides an apparatus for allowing users of hearing aids to use a wireless phone without the need for an inductive loopset apparatus.

2. Description of Related Art

Users of hearing aids commonly experience interference from the high-frequency electromagnetic signal emitted by wireless phones when the phone is placed in close proximity to the hearing aid. The interference—often characterized as a "buzz" or "hum" in the hearing aid—makes the use of wireless phone handsets difficult for hearing-impaired users. A hearing aid wearer is often not able to effectively use a wireless phone by placing the handset in proximity close enough to hear a caller through the earpiece of the handset. Thus, the user is forced to endure the discomfort of the "hum" or use an induction-type device.

The interference that is presented to the hearing aid results mainly from signals transmitted from the antenna attached to the wireless phone. Thus, the inventors have discerned that there is a need to address the above-mentioned problems by providing an apparatus that can capture, redirect or reposition the transmitted signals away from the hearing aid.

SUMMARY OF THE INVENTION

As discussed above, hearing aid users experience interference from signals being transmitted from antennas attached to wireless phones. Thus, an object of the invention is to provide a device that captures and moves the interfering signals away from the hearing aid.

For purposes of this invention, a wireless phone handset shall include wireless telephones (AMPS, TDMA, CDMA, GSM, or any other type of wireless telephone technologies), cordless phones (900 MHz, 2.4 GHz, etc.) or other landline phones with remote handsets, two-way radios, walkie-talkies and other wireless communication devices.

This invention provides a remote transmission point for an antenna for a wireless phone that extends the antenna of the wireless phone to a position away from the hearing aid. This configuration provides a system wherein transmitted signals do not interfere with either the t-coil or the circuitry of the hearing aid.

This invention also provides an auxiliary antenna for a fixed antenna wireless phone that electromagnetically couples the fixed antenna to a second transmitting point away from the hearing aid.

This invention also provides an auxiliary antenna for internal antenna wireless phones that electromagnetically couples the internal antenna to a second transmitting point, away from the hearing aid.

These and other features and advantages of this invention are described in or apparent from the following detailed description of the apparatus according to this invention.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

The exemplary embodiments of the systems according to this invention provide a device that can redirect or move interfering signals away from a wireless phone and away from a hearing aid so that the signals do not provide interfering radio signals to a t-coil equipped hearing aid when a wireless phone is being used. In the exemplary embodiments, devices are provided that address the interference problems for both fixed antenna handsets and internal antenna handsets.

Figure 1:
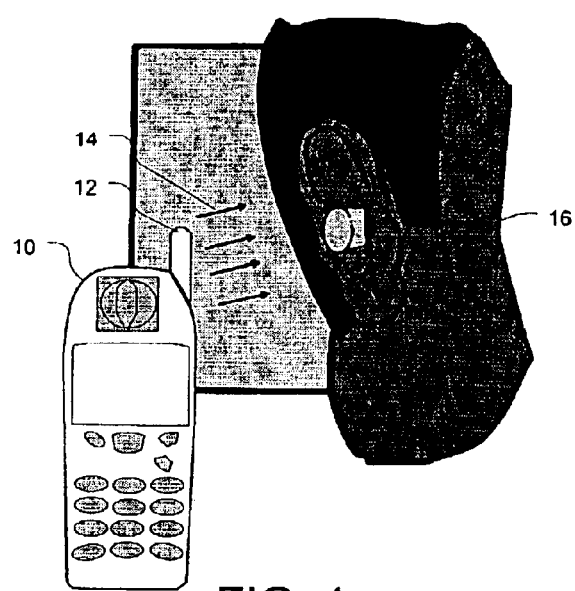
FIG. 1 illustrates a conventional wireless phone transmitting interfering signals to a hearing aid.

FIG. 1 illustrates the problems associated with a conventional wireless phone 10 configuration, as interfering signals 14 are being transmitted towards a hearing aid 16 from antenna 12. As seen in this illustration, when in close proximity, the interfering signals 14 have a direct path to the hearing aid 16. This close proximity, as mentioned above, produces undesirable interference in of the hearing aid.

Figure 2:
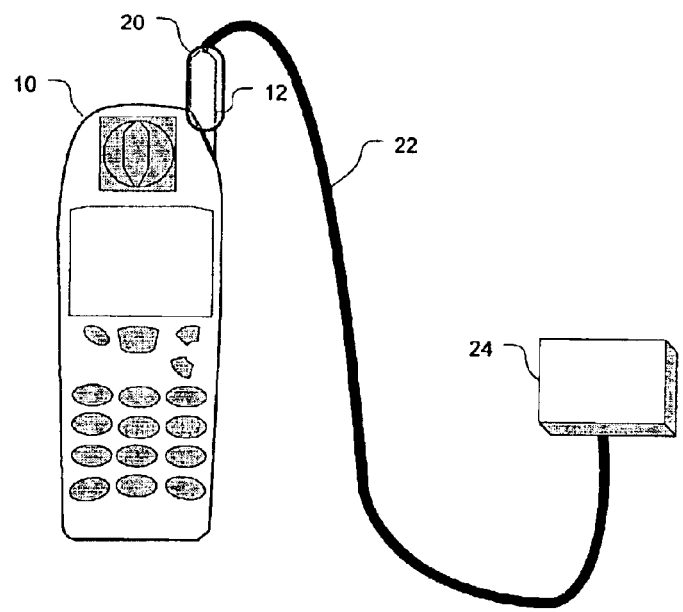
FIG. 2 illustrates an auxiliary antenna configuration for a fixed antenna application, according to this invention.

FIG. 2 illustrates a first exemplary embodiment of an auxiliary antenna, according to this invention. In this example, the handset 10 has a fixed antenna configuration. As shown, a RF capture device 20 is connected to the fixed antenna 12 of the handset 10. Connected to the RF capture device 20 is transmission point 24 via signal line 22. The RF capture device 20 is preferably made of any material that is capable of coupling interfering signals away from the fixed antenna 12 and redirecting transmitting waves toward the transmission point 24. The signal line 22 preferably is a co-axial cable however; any type of shielded cable capable of transmitting the antenna signals without significant loss could be used.

The transmission point 24 acts a remote antenna for the handset 10. Signals from the handset 10 are transmitted and received at the transmission point 24. The transmission point 24 can be placed in any location away from a user's hearing aid, such as, clipped to a belt loop, place in a shirt pocket, etc. With the transmission point 24 radiating the outgoing signals and receiving input signals away from the user's hearing aid, the handset 10 can then be placed in close proximity to the hearing aid without causing harmful interference to the hearing aid.

It will be appreciated by those skilled in the art that this embodiment may be modified to accommodate any size fixed antenna as well as telescopic antennas without departing from the scope and intent of this invention.

Figure 3:
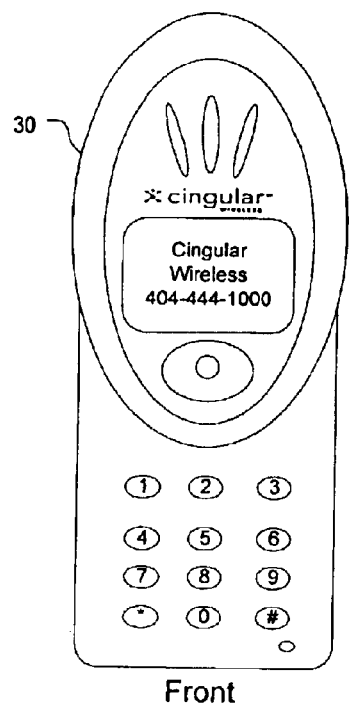
FIG. 3 illustrates a front view of a conventional wireless phone handset having an internal antenna configuration.
Figure 4:
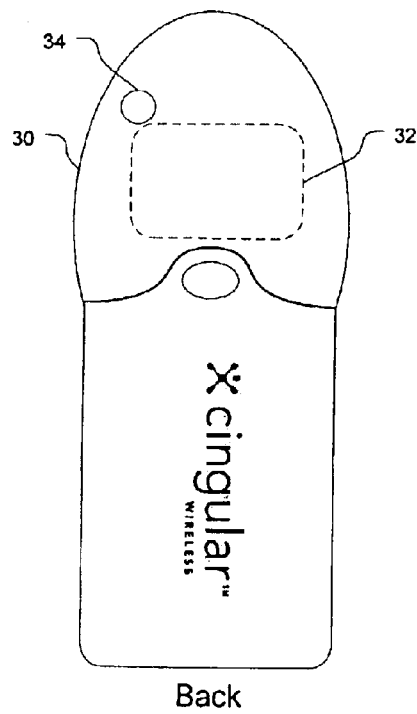
FIG. 4 illustrates a back view of a conventional wireless phone handset having an internal antenna configuration.

FIGS. 3 and 4 illustrate a conventional wireless phone handset 30 having an internal antenna configuration. As shown in FIG. 4, the internal antenna 32 is typically located below the surface of the back cover of the handset 30. The antenna 32 transmits and receives signals through the back plate of the handset. On some internal antenna handsets, there is an antenna jack 34 on the back face of the handset 30 so that an auxiliary antenna can be plugged into the jack to provide increased signal strength to the handset 30.

Figure 5:
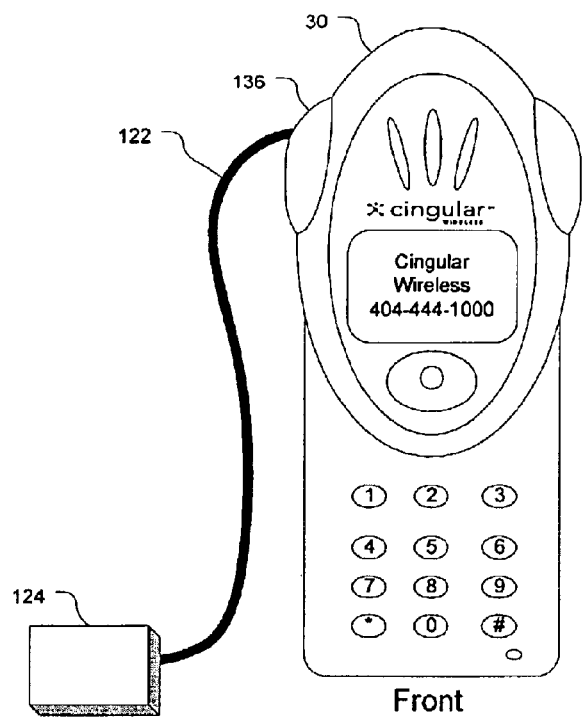
FIG. 5 illustrates front view of an auxiliary antenna configuration for an internal antenna application, according to this invention.
Figure 6:
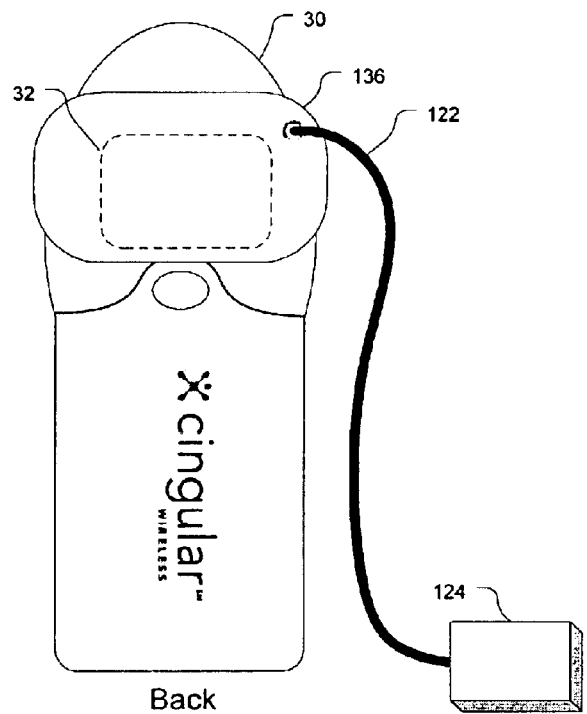
FIG. 6 illustrates a back view of an auxiliary antenna configuration for an internal antenna application, according to this invention.

FIGS. 5 and 6 illustrate another embodiment of this invention. In this embodiment, the conventional handset 30 of FIGS. 3 and 4 has a waveguide 136 attached. The RF capture device 136 is attached to the wireless phone in a position that covers and captures transmission of interfering signals from the antenna 32 and antenna jack 34, if present. Connected to the RF capture device 136 is transmission point 124 via signal line 122. Again, the RF capture device 136 is preferably made of any material capable of capturing the transmitted wave signals from the internal antenna 32 and redirecting the waves toward the transmission point 124. The transmission point 124 then operates as previously described. On some phones, it is possible that plugging a cable into an antenna jack will cause the internal antenna to become disconnected from the transmitter. In this way, the transmission point 124 can be connected to the handset.

Figure 7:
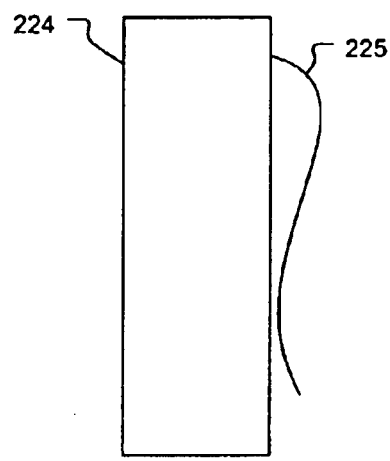
FIG. 7 illustrates the preferred embodiment of the transmission point according to this invention.

FIG. 7 illustrates a side view of the preferred embodiment of the transmission point according to this invention. The transmission point 224 contains a belt clip 225 attached to the backside of its housing. The belt clip 225 can be attached to the belt, pants, shirt pocket or the like of a user. It should be appreciated by one skilled in the art that the belt clip 225 may be made into many different ornamental shapes, and placed in many different locations on the transmission point 224 without departing from the scope and intent of this invention.

Figure 8:
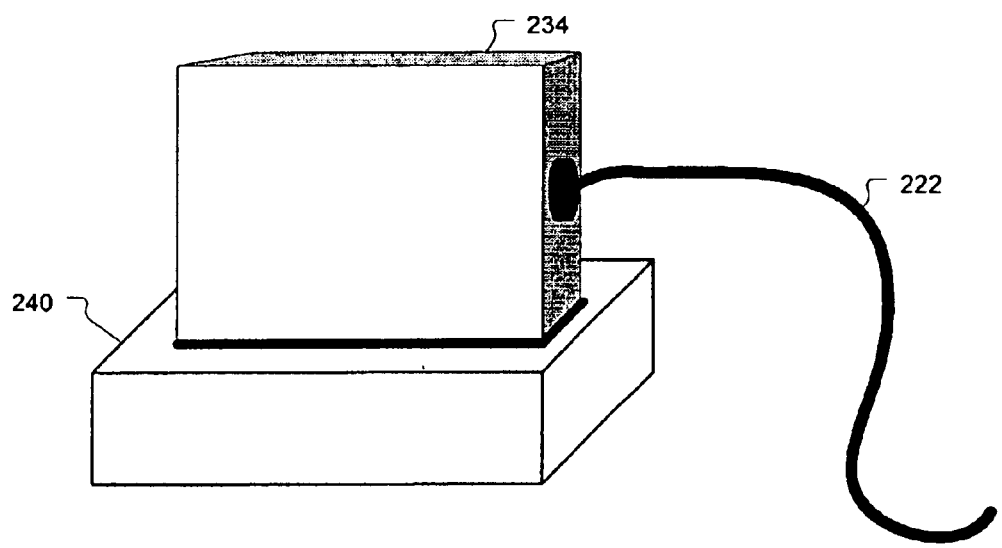
FIG. 8 illustrates an alternate embodiment of the transmission point according to this invention.

FIG. 8 illustrates an alternate embodiment of the transmission point according to this invention. In this configuration, the transmission point 234 is placed on a stand 240. Using this sort of configuration, the transmission point 234 can be placed on the stand 240, away from the hearing aid of the user. For example, the stand 240 can be placed on a tabletop or the like. Just as in previous embodiments, the transmission point 234 is fed antenna signals from a wireless device across the signal line 222.

Figure 9:
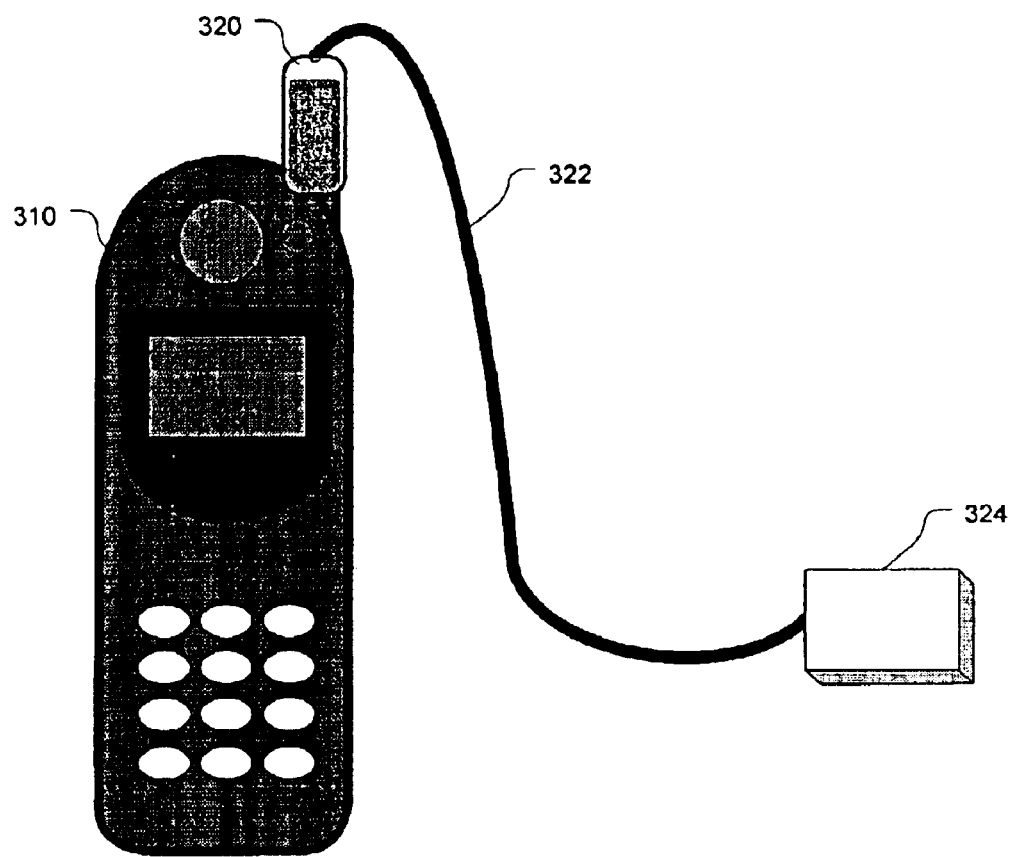
FIG. 9 illustrates an alternate embodiment of the present invention applied to a cordless phone.

In another embodiment similar to the embodiments described with respect to FIG. 2, the auxiliary antenna concept of the present invention can also be applied to cordless phones. As shown in FIG. 9, the cordless phone 310 has a fixed antenna configuration similar to the handset 10 of FIG. 2. Using the RF capture device 320, the signal line 322 and the transmission point 324, the interfering signals transmitted from the antenna of the handset 310, will be redirected to the transmission point 324. Operation of this configuration is essentially identical to the embodiment shown in FIG. 2. It should be appreciated that the cordless telephone can also have an internal antenna configuration without departing from the scope of this invention.

One of ordinary skill in the art will appreciate that this invention can be applied to other landline phone configurations with remote handsets, two-way radios, walkie-talkies and other wireless communication devices without departing from the scope and the intent of this invention.

While this invention has been described in conjunction with the exemplary embodiments outlined above, it will be evident to those skilled in the art that many alternatives, modifications and variations exist. Accordingly, the exemplary embodiments of the invention, as set forth above are intended to be illustrative, not limiting. Various changes may be made without departing from the spirit and the scope of the invention.

What is claimed is:

1. A method for preventing signal transmissions from a primary antenna of a wireless phone handset from causing an interference in a hearing aid device, comprising the steps of:

coupling an RF capture device with the primary antenna of the wireless phone handset, such that signal transmissions from the primary antenna are captured by the RF capture device;

associating a transmission point with the RF capture device; and transmitting the signal transmissions originating at the primary antenna from the transmission point in a direction that does not cause interference in the hearing aid device.

2. The method of claim 1, wherein the RF capture device and the transmission point are connected using a transmission cable.

3. The method of claim 2, wherein the transmission cable is a co-axial cable.

4. A method for preventing signal transmissions from a primary antenna of a wireless phone handset from causing an interference in a hearing aid device, comprising the steps of:

coupling an RF capture device with the primary antenna of the wireless phone handset, such that signal transmissions from the primary antenna are captured by the RF capture device;

associating a transmission point to the RF capture device; and transmitting the signal transmissions originating at the primary antenna from the transmission point at a distance that does not cause interference in the hearing aid device.

5. The method of claim 4, wherein the RF capture device and the transmission point are associated using a transmission cable thereby enabling remote transmission or signals at the distance that does not cause interference in the hearing aid device.

6. The method of claim 5, wherein the transmission cable is a co-axial cable.

7. A method for preventing signal transmissions from a primary antenna of a wireless phone handset from causing an interference in a hearing aid device, comprising the steps of:

coupling an RF capture device with the primary antenna of the wireless phone handset, such that signal transmissions from the primary antenna are captured by the RF capture device;

associating a transmission point with the RF capture device;

positioning the transmission point such that signal transmitted from the transmission point do not cause interference in the hearing aid; and transmitting the signal transmissions originating at the primary antenna from the transmission point.

* * * * *